United States Patent

[11] 3,598,423

| [72] | Inventor | Willi Clarenbach |
| | | Wuppertal-Barmen, Germany |
| [21] | Appl. No. | 798,359 |
| [22] | Filed | Feb. 11, 1969 |
| [45] | Patented | Aug. 10, 1971 |
| [73] | Assignee | Langen & Co. |
| | | Dusseldorf, Germany |

[54] LEVEL-REGULATING VALVE OF THE PISTON VALVE TYPE PARTICULARLY FOR USE WITH ROAD VEHICLES
8 Claims, 5 Drawing Figs.

| [52] | U.S. Cl. | 280/124, 137/625.68 |
| [51] | Int. Cl. | B60g 17/00 |
| [50] | Field of Search | 280/124 F, 124 LR, 6; 137/625.68, 625.69, 625.67 |

[56] References Cited
UNITED STATES PATENTS

| 2,925,284 | 2/1960 | Szostak | 280/124 F |
| 3,026,103 | 3/1962 | Gates | 280/124 F |
| 3,032,065 | 5/1962 | Jolley | 137/625.68 |
| 3,099,461 | 7/1963 | Stelzer | 280/124 F |
| 3,280,842 | 10/1966 | Weisenbach | 137/625.69 |

*Primary Examiner*—Philip Goodman
*Attorney*—Holman & Stern

ABSTRACT: A level-regulating valve of the piston valve type for road vehicles which, in dependence upon the distance variations between sprung and unsprung bodies, connects a pressure space of an adjusting component positioned between such bodies in a first regulating position with a source of pressure, in a second regulating position with a discharge and in a third regulating position which corresponds to the level position of the vehicle a blockage of such connections with the distance variations being transmitted via linkages to the level-regulating valve.

INVENTOR
WILLI CLARENBACH

ATTORNEYS

INVENTOR
WILLI CLARENBACH

BY Holman, Glascock, Downing
+ Seebold

ATTORNEYS

LEVEL-REGULATING VALVE OF THE PISTON VALVE TYPE PARTICULARLY FOR USE WITH ROAD VEHICLES

BACKGROUND OF THE INVENTION

As is known in the art, it is not possible in vehicles to translate relatively large variations in distance between sprung and unsprung bodies which are effected by load changes or by dynamic roadway shocks entirely into a movement of the piston valve. Lever transmission assemblies have been employed in which resilient members were partly installed and by means of such resilient members it was possible to transmit minor linkage movements directly to the piston valve whereas major deflections resulted only in a shortening or lengthening of the resilient members. Another known assemblage resided in driving a piston valve by means of the cam disk and in this fashion it was possible to accomplish a defined maximum stroke of the piston valve independent of the deflection of the linkage. However, this was offset as in all such arrangements, by a requirement for larger space and an increase in constructional expenditure. Moreover, with a cam disk, force locking between the piston valve and the cam disk was effected only in one direction while in the opposite direction the force locking was maintained by a return spring. This force locking arrangement reduces safety as compared to a forced guidance.

SUMMARY OF THE INVENTION

It is therefore an object of the present invention to overcome the above objectionable features existing in the art and to provide a reliable level-regulating valve of the type in question which includes a minimum number of salient working parts and which requires a minimum of space as compared to conventional assemblages.

According to the invention, the problem is solved in that rotary movement is imparted to a piston valve by a linkage with a thread or threadlike guide being arranged on the piston valve so that the piston valve, in addition to its rotary movement, executes an axially directed translatory movement in cooperation with a corresponding thread or guide in the valve housing, or a guide element which is immovable axially by the piston valve relative to the valve housing.

In a further development of the present invention, a guide element which can be rotated relative to the valve housing and to the piston valve by means of an additional linkage, Bowden wire, etc. is provided for the random preselection of a level. The guide element is preferably immovable in the axial direction in the valve housing or at least possesses a different pitch relative to the valve housing than relative to the piston valve. In view of the fact that the linkage must follow the minor axial movements of the piston valve, it is desirable that the linkage be flexible in the corresponding loading position but the linkage can also be suspended in a flexible manner.

With a rigid linkage it is possible to make the piston valve of two parts which can be displaced in the axial direction relative to each other but not rotated, with the part provided for controlling the pressure medium being guided relative to the valve housing while the other part is not capable of axial displacement. To avoid an increased pressure medium consumption in dynamically produced movements of the piston valve, the diameters of the waists of the piston valve are, in a known manner, only slightly smaller at one point of the effective flow cross section than the diameters of the shoulders of the piston. In order to ensure a simple and accurate balancing of the various adjusting members to a certain initial level position, the linkage can be fixed in any angular position with respect to the piston valve by clamping or the like.

A movement of the adjusting member to their end stops can be accomplished by displacing or turning the guide element such that the maximum axial movement of the piston valve that can be achieved by the rotary movement of the linkage is insufficient to block the connection for the pressure medium provided by a displacement or rotation of the guide element.

Further important objects and advantages of the present invention will become more readily apparent to persons skilled in the art from the following detailed description and annexed drawings, in which:

DETAILED DESCRIPTION OF THE INVENTION

Figures 1, 3:
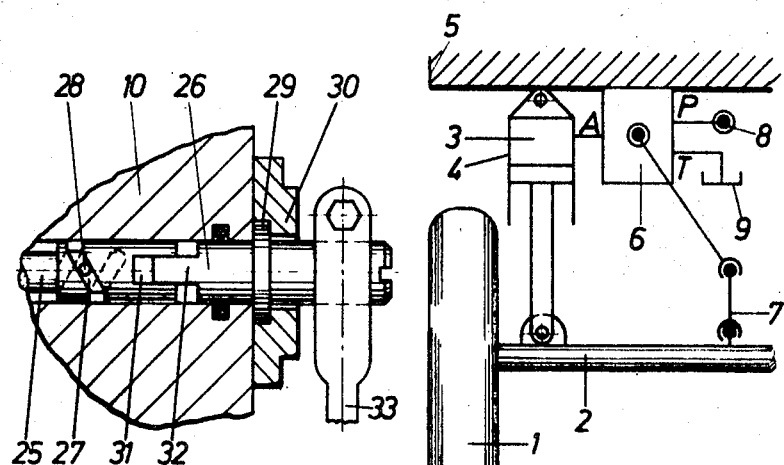
FIG. 1 is a fragmentary view diagrammatically illustrating the components constituting a level-regulating device.
FIG. 3 is a fragmentary view partly in cross section and partly in elevation of a part of a valve provided with a two-part piston.

As shown in FIG. 1, a wheel 1 of a vehicle (not illustrated) is suitably secured to an axle or guide rod 2 which supports a leg of a fluid pressure unit 4 operably connected to a vehicle body 5 with a pressure space 3 being provided above the piston of the leg. A level-regulating valve 6 is also affixed to the vehicle body 5 and is actuated by means of a linkage 7 which is suitably secured to the axle 2. The level-regulating valve is provided with three ports namely, ports A, T, and P. The port A is connected with the pressure space 3, the port P with a source of pressure 8 and the port T with a discharge or drain 9.

Figure 2:
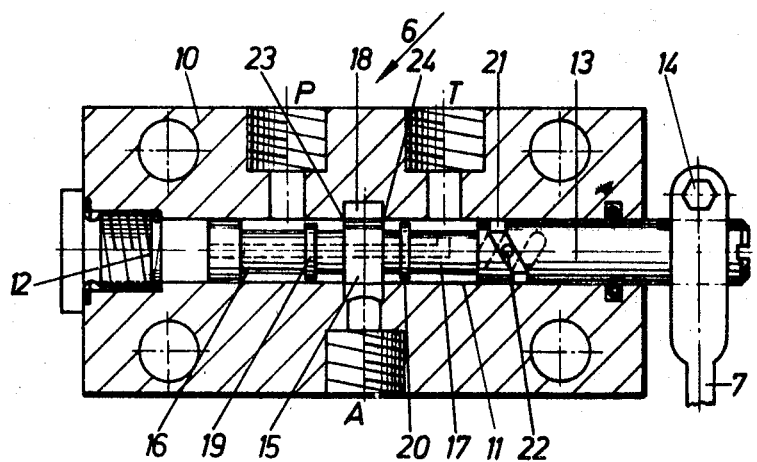
FIG. 2 is a view partly in cross section and partly in elevation of a level-regulating valve embodying the present invention.

Referring to FIG. 2, it will be noted that the level-regulating valve 6 includes a housing 10 provided with a bore 11 which is closed at one end by a closure plug 12. A piston valve 13 is guided in the bore 11 and the linkage 7 is secured to the free end of the piston valve 13 which projects beyond the housing by means of a clamping screw or the like 14.

The piston valve is provided with two waists 16 and 17 and the waists are separated by a shoulder 15 in the area in which the ports P and T communicate with the bore 11. The bore A is in communication with an annular duct 18 which is closed in the level position of the vehicle toward the bore 11 by means of the shoulder 15. The waists 16 and 17 in the range of their effective cross section are provided with at least one point 19 and 20 at which their diameter is slightly less than that of the shoulder 15. A thread 21 of the valve 13 coacts with a corresponding thread in the housing 10 or a pin 22 engaging the thread 21 and secured on the housing 10 (illustrated diagrammatically only by the projection of the pin on the valve 13) to effect a longitudinal movement of the piston valve 13. The active control edges of the shoulder 15 are denoted 23 and 24.

With reference to FIG. 3, there is illustrated a piston valve including two parts 25 and 26. The part 25 is provided with a thread 27 which is engaged by a pin 28 (diagrammatically illustrated as a projection) and the part 26 is provided with a shoulder 29 which is axially held by a cover or lid 30. The part 25 is formed with a recess 31 which is engaged by an axially moving lug 32 of the part 26 and a linkage 33 which can be rigid is utilized to impart rotation to the part 26.

Figure 4:
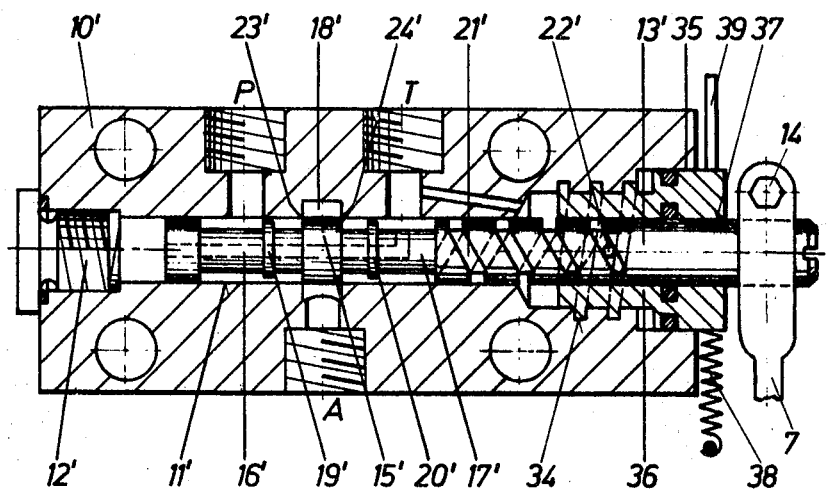
FIG. 4 is a view partly in cross section and partly in elevation of an arrangement for adjusting any vertical position of the vehicle.

In FIG. 4, the housing 10' is provided with a bore 11' which is closed at one end by a closure plug 12'. A piston valve 13' is positioned in the bore 11'. The bore 11' widens into a threaded bore 34 which in turn merges with a widened bore 35. A guide element 36 is threaded into the bore 34 and the guide element 36 is provided with a longitudinal bore 37 in which a portion of the piston valve 13' is disposed. A pin 22' is also secured in the guide element 36 and the guide element 36 can be rotated by means of a Bowden wire 39 which operates against a return spring 38.

It will further be noted that the piston valve 13' is provided with two waists 16' and 17' separated by a shoulder 15' in the area of the bores P and T which communicate with the bore 11'. The waists 16' and 17' in the area of their effective cross section have at least one point 19' and 20' at which their diameter is slightly less than that of the shoulder 15'.

A thread 21' for the valve 13' coacts with a corresponding thread in the housing 10'. The active control edges of the shoulder 15' are denoted 23' and 24'.

Figure 5:
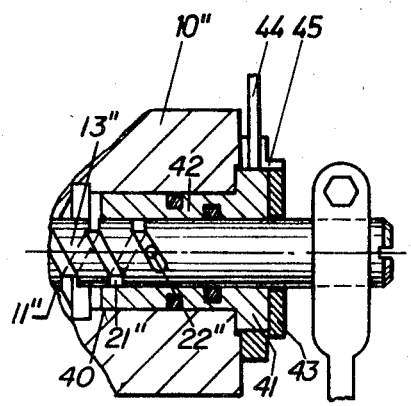
FIG. 5 is a fragmentary view partly in elevation and partly in cross section of another embodiment of the invention illustrated in FIG. 4.

In FIG. 5 it will be seen that a bore 11'' widens into a bore 40 and a guide element 42 provided with a collar 41 is disposed in the bore 40. The collar 41 is lodged or located between the housing 10'' and a cover or lid 43 and consequently, the collar cannot move in the axial direction. A pin 22'' secured in the guide element 42 engages a thread 21'' of piston valve 13''. A lever or Bowden wire 44 which is received in a recess 45 of the cover 43 serves as component for operating the guide element 42.

While the operation of the level-regulating valve as illustrated in FIG. 2 is believed clear, the operation may be summarized as follows:

Assuming that the vehicle has been subjected to a load increase so that the distance between the vehicle body 5 and the axle 2 is shortened, this shortening via the linkage 7 effects a counterclockwise rotation of the piston valve 13. In view of the fact the thread 21 has a right-hand pitch, the piston valve 13 will move out of the housing 10 so that the control edge 23 opens the connection defined by bores P, 11 and A. Hence, the pressure medium flow into the pressure space 3 of the unit 4 and the distance between the vehicle body 5 and axle 2 again increases and the linkage 7 rotates the piston valve 13 in the opposite direction until the control edge 23 again closes or blocks the connection between bore P, bore 11 and bore A. On the other hand, a reduction of the load will effect a clockwise rotation of the piston valve so that the control edge 24 will establish communication between bore A, bore 11 and bore T. Hence, the pressure medium will thus flow out of the pressure space 3 with the distance between the vehicle body 5 and the axle 2 again shortening with the linkage 7 rotating the piston valve 13 in a counterclockwise direction until the controlled edge 24 blocks the connection between bore A, bore 11 and bore T.

The alignment of the vehicle in a certain level position can be effected quite simply by manually adjusting the piston valve 13 upon loosening of the clamping screw 14 such as by means of a wrench until it corresponds to the desired level position. Thereafter the linkage is again secured. In view of the fact the linkage 7 must follow the axial displacement of the piston valve 13, the linkage should be flexible at least over part of its length or, as illustrated in FIG. 1, be suspended in a flexible fashion.

In the event a design of this type is not possible for the linkage, a device as shown in FIG. 3 employing a rigid linkage 33 can be utilized. The linkage 33 acts upon the axially immovable part 26 of the two-part piston valve whose other part 25 functions as represented in FIG. 3. The rotary movement of the part 26 is transmitted by means of the lug 32 and the recess 31 to the part 25 and the axial displacement of the part 25 is insured by reason of the fact that the recess 31 and lug 32 can also be moved relative to each other in the axial direction.

Referring now to the regulating valve disclosed in FIG. 4, this valve embodies a device for setting any desired level position and such device essentially includes the guide element 36 rotatably mounted in the housing 10'. A rotary movement of the guide element 36 causes, by means of thread 34, an axial displacement thereof and assuming the threads 34 and 21' possess different pitches, the piston valve 13' is also displaced axially via pin 22' so that, dependent upon the direction of rotation of the guide element 36, communication between bore P, bore 11' and bore A or bore P, bore 11' and bore T is established. Consequently, the distance between the vehicle body 5 and the axle 2 is thereby shortened or lengthened. Although the level position is indicated on the piston valve 13' via the linkage 7, the closing of the communication between bore P, bore 11' and bore A or bore A, bore 11' and bore T is no longer effected in the original level position in view of the fact that the position of the reference point, namely, the pin 22' has changed for the movement of the piston valve 13'. In the event the displacement of the piston valve 13' which is brought about by the rotation of the guide element is greater than the displacement which can be achieved by the rotation of the piston valve 13' by the linkage 7, the communication between bore P, bore 11' and bore A and Bore A, bore 11' and bore T respectively remain permanently open so that the piston of the unit 4 moves toward its end stops. Such a measure is desired, for example, in commercial vehicles such as truck cranes which should be softly sprung during riding conditions but where, on the other hand, a possible rigid connection between the body and the wheels is desired during the hoisting of loads for reducing the tendency for the vehicle to tip or tilt.

The same results can also be accomplished with the embodiment illustrated in FIG. 5. In this embodiment, the guide element 42 is not axially displaceable but can be rotated by means of a Bowden wire 44. This rotation effects, via the pin 22'', an axial movement of the piston valve 13'' in a fashion similar to that previously described in connection with FIG. 4.

It is believed clear that the present invention is not limited to the embodiments illustrated and in particular, the piston valves can be of different structural detail such as for example, with only two shoulders. Furthermore, the actuation of the guide element can be selected as freely as the fastening of the linkage to the piston valves and lastly, the invention is also suitable for pneumatic shock absorbers, hydropneumatic or mechanical resilient suspensions provided with adjusting members arranged either ahead of or behind the same.

What I claim is:

1. A level-regulating valve of the piston valve type for vehicles, which is adapted to connect, dependent upon the distance variations between sprung and unsprung bodies, a fluid pressure chamber of an adjusting means, arranged between the bodies, in a first regulating position, with a source of pressure fluid, in a second regulating position with a discharge and in a third regulating position corresponding to the level position of the vehicle to block such connections, and linkage means for transmitting the distance variations to the level-regulating valve, the improvement comprising a housing, said housing having first and second axially spaced ports, both of which communicate with the interior thereof and one each with the source of pressure fluid and the discharge, and a third port intermediate the first and second ports communicating with the fluid pressure chamber and an annular duct within the housing, a piston valve mounted for axial movement within the housing, said piston valve having a shoulder which, in the level position of the vehicle closes the annular duct and a waist portion of lesser diameter than the shoulder, means connecting the linkage means to the piston valve for imparting rotary movement to the piston valve, and complemental thread means for the piston valve and housing for effecting axially directed translatory movement of the piston valve whereby upon shortening of the distance between the sprung and unsprung bodies, the linkage means effects a rotation of the piston valve in a first direction to provide a connection between the port connected to the pressure fluid, the annular duct and the third duct, whereby the pressure fluid flows into the pressure chamber to increase the distance between the sprung and unsprung bodies, with the linkage rotating the piston valve in the opposite direction so that the shoulder closes the connection between the port connected to the pressure fluid, the annular duct and the third port, while a lengthening of the distance between the sprung and unsprung bodies causes the linkage means to effect a rotation of the piston valve in a second direction to establish a connection between the third port, the annular duct and the port connected to the discharge to enable the pressure fluid to flow from the pressure chamber, thus shortening the distance between the sprung and unsprung bodies with the linkage rotating the piston valve in a direction opposite to said second direction until the shoulder blocks the connection between the third port, the annular duct and the port connected to the discharge.

2. The level-regulating valve as claimed in claim 1 including a guide element positioned in said housing for rotation relative to the housing and piston valve, additional linkage means for rotating the guide element, said guide element having thread means of a different pitch than the thread means of the housing and the piston valve and at least a portion of said piston valve being mounted in said guide element.

3. The level-regulating valve as claimed in claim 1 in which said linkage means is flexible in the axial direction of movement of the piston valve.

4. The level-regulating valve as claimed in claim 1 in which said piston valve includes two parts, said two parts being nonrotatable but axially displaceable relative to each other, one of said parts being secured against axial movement in the housing, and a rigid linkage connected to said one part and the other of said parts having a thread means.

5. The level-regulating valve as claimed in claim 4 in which the shoulder and the waist portion are positioned on the other of said parts as is the annular duct and the three ports, and the waist portion is on each side of the shoulder.

6. The level-regulating valve as claimed in claim 1 including clamping means for fixing the linkage means in any desired angular position with respect to the piston valve.

7. The level-regulating valve as claimed in claim 2 in which the maximum axial displacement of the piston valve capable of being achieved by rotating the guide element is greater than the axial displacement capable of being achieved by rotating the piston valve by the linkage means.

8. The level-regulating valve as claimed in claim 1 wherein said housing is provided with a longitudinal bore in which said piston valve is mounted for movement, there being a waist portion on each side of the shoulder and there being at least a portion of each said waist portion which is only slightly less than the diameter of the shoulder.